(12) United States Patent
Tanaka

(10) Patent No.: US 8,051,838 B2
(45) Date of Patent: Nov. 8, 2011

(54) FUEL INJECTION CONTROL DEVICE

(75) Inventor: Makoto Tanaka, Kariya (JP)

(73) Assignee: Denso Corporation, Kariya (JP)

( * ) Notice: Subject to any disclaimer, the term of this patent is extended or adjusted under 35 U.S.C. 154(b) by 230 days.

(21) Appl. No.: 12/575,614

(22) Filed: Oct. 8, 2009

(65) Prior Publication Data

US 2010/0089366 A1    Apr. 15, 2010

(30) Foreign Application Priority Data

Oct. 9, 2008  (JP) ................................ 2008-262657

(51) Int. Cl.
*F02M 51/00* (2006.01)
(52) U.S. Cl. ........................................ 123/488; 701/105
(58) Field of Classification Search .................. 123/478, 123/480, 488; 701/103, 104, 105
See application file for complete search history.

(56) References Cited

U.S. PATENT DOCUMENTS

| | | | |
|---|---|---|---|
| 5,732,675 A | 3/1998 | Yoshida et al. | |
| 6,725,837 B2 * | 4/2004 | Hiraku et al. | 123/436 |
| 6,820,596 B2 * | 11/2004 | Namari et al. | 123/501 |
| 6,971,370 B2 * | 12/2005 | Suenaga et al. | 123/436 |
| 7,418,337 B2 * | 8/2008 | Toyohara et al. | 701/104 |
| 7,509,944 B2 * | 3/2009 | Okamura | 123/478 |
| 7,596,447 B2 * | 9/2009 | Oono | 701/114 |
| 7,610,141 B2 * | 10/2009 | Toyohara et al. | 701/104 |
| 7,835,850 B2 * | 11/2010 | Nakata et al. | 701/104 |
| 2007/0006851 A1 * | 1/2007 | Okamura et al. | 123/478 |
| 2008/0228374 A1 * | 9/2008 | Ishizuka et al. | 701/103 |

FOREIGN PATENT DOCUMENTS

JP  9-195819  7/1997

* cited by examiner

*Primary Examiner* — Thomas Moulis
(74) *Attorney, Agent, or Firm* — Nixon & Vanderhye PC

(57) ABSTRACT

A high-pressure pump section pumps fuel in a fuel tank into a delivery pipe. An injector injects the fuel in the delivery pipe directly into a combustion chamber of an engine. An ECU calculates fuel injection quantity based on an operation state of the engine and calculates fuel injection time based on the fuel injection quantity and pressure of the fuel in the delivery pipe. The ECU calculates fuel injection start timing based on the operation state of the engine. The ECU sets the fuel injection time and the fuel injection start timing as a base injection period. When a fuel inflow period, in which the high-pressure fuel flows into the delivery pipe with the fuel pumping by the high-pressure pump section, overlaps with the base injection period, the ECU changes the base injection period to eliminate or reduce the overlap.

7 Claims, 6 Drawing Sheets

FUEL INJECTION CONTROL DEVICE

CROSS REFERENCE TO RELATED APPLICATION

This application is based on and incorporates herein by reference Japanese Patent Application No. 2008-262657 filed on Oct. 9, 2008.

BACKGROUND OF THE INVENTION

1. Field of the Invention

The present invention relates to a fuel injection control device applied to a fuel supply system that supplies fuel to an internal combustion engine.

2. Description of Related Art

Conventionally, as a fuel supply system of a direct-injection gasoline engine, there has been practically used a fuel supply system that has a low-pressure pump for drawing fuel from a fuel tank and for pressurizing the fuel, a high-pressure pump driven by an engine for further pressurizing the fuel discharged by the low-pressure pump and a delivery pipe for storing the fuel pumped from the high-pressure pump and that injects the high-pressure fuel in the delivery pipe from the injector directly into a cylinder of the internal combustion engine (for example, as described in Patent document 1: JP-A-H9-209804). Generally, in such the system, pressure of the fuel in the delivery pipe is regulated to target pressure by controlling fuel pumping quantity of the high-pressure pump. Fuel injection quantity of the injector changes with injection pressure during the fuel injection, i.e., the pressure of the fuel in the delivery pipe. Therefore, the fuel injection quantity is set based on an operation state of the engine and a fuel injection period is set based on the fuel injection quantity and the pressure of the fuel in the delivery pipe (for example, as described in Patent document 2: JP-A-H9-195819).

The high-pressure pump repeats suction and discharge of the fuel in synchronization with a crank angle of the engine, and the pressure of the fuel in the delivery pipe rises at every discharge of the high-pressure pump. Therefore, if the fuel injection is performed such that the fuel injection overlaps with the pressure increase, an error arises in the fuel injection quantity.

SUMMARY OF THE INVENTION

It is an object of the present invention to provide a fuel injection control device that inhibits an error in fuel injection quantity.

According to a first example aspect of the present invention, a fuel injection control device is applied to a fuel supply system that has a pump section driven by an internal combustion engine for pumping fuel in a fuel tank, an accumulator for storing the fuel pumped by the pump section and an injector for performing injection supply of the fuel in the accumulator directly into a cylinder of the internal combustion engine. The fuel injection control device controls fuel injection quantity of the injector. The fuel injection control device has an injection period setting section, an overlap determining section and an injection period changing section. The injection period setting section sets an injection period of the fuel of the injector based on the fuel injection quantity of each time and pressure of the fuel in the accumulator before the fuel injection. The overlap determining section determines whether the fuel injection period set by the injection period setting section overlaps with a fuel inflow period, in which the high-pressure fuel flows into the accumulator with the fuel pumping by the pump section. The injection period changing section changes the fuel injection period (base injection period) set by the injection period setting section to an advance side or a delay side to eliminate or reduce the overlap when the overlap determination section determines that the fuel injection period overlaps with the fuel inflow period.

Generally, in a direct-injection internal combustion engine that injects fuel directly into a cylinder of the engine, a fuel injection period is set based on an operation state of the internal combustion engine and the like. In such the case, if a fuel injection period overlaps with a fuel inflow period, fuel injection pressure during the fuel injection changes with fuel inflow into an accumulator. Accordingly, there is a possibility that an error arises between fuel injection quantity actually injected in the fuel injection period, which is set based on the pressure of the fuel in the accumulator before the fuel injection start, and the set fuel injection quantity. Regarding this point, according to the first example aspect of the present invention, the overlap between the fuel injection period of the injector and the fuel inflow period to the accumulator is eliminated or reduced by changing the base injection period. Accordingly, the change of the fuel injection pressure accompanying the fuel inflow into the accumulator during the fuel injection is inhibited. Thus, the error in the fuel injection quantity can be inhibited.

As a construction for eliminating or reducing the overlap between the fuel injection period and the fuel inflow period, there is also a construction that changes the fuel inflow period. However, since the pump section driven by the internal combustion engine repeats the suction and the discharge of the fuel in synchronization with a crank angle of the internal combustion engine, a setting range of a fuel pumping period of the pump section is restricted. Therefore, it is thought that the fuel inflow period cannot be changed largely as compared to the fuel injection period. Thus, it is desirable to change the fuel injection period as in the present invention.

As the result of the inflow of the high-pressure fuel into the accumulator during the fuel inflow period, the pressure of the fuel in the accumulator on a more delayed side than the fuel inflow period becomes higher than the pressure of the fuel in the accumulator on a more advanced side than the fuel inflow period. That is, the fuel injection pressure on the delay side of the fuel inflow period is higher than the fuel injection pressure on the advance side of the fuel inflow period.

Therefore, according to a second example aspect of the present invention, the injection period changing section performs decrease correction of a duration of the fuel injection period when the injection period changing section changes the already-set fuel injection period to the delay side. Thus, in consideration of the increase of the fuel injection pressure across the fuel inflow period, the duration (fuel injection time) is shortened in the case where the fuel injection period is changed to the delay side. Thus, when the fuel injection period is changed into a range on the delay side, the error of the fuel injection quantity accompanying the change can be inhibited.

When the decrease correction of the duration of the above-described fuel injection period is performed, it is desirable to calculate a pressure increase width of the fuel in the accumulator during the fuel inflow period, i.e., an increase width of the fuel injection pressure, and to set correction quantity corresponding to the increase width.

According to a third example aspect of the present invention, the injection period changing section prioritizes change of the fuel injection period to the advance side over change of the fuel injection period to the delay side when the injection period changing section changes the fuel injection period.

According to the third example aspect of the present invention, the time from the fuel injection to ignition can be secured by changing the fuel injection period to the advance side. Thus, the fuel and the air are mixed suitably, and homogeneous combustion can be performed suitably in the internal combustion engine.

According to a fourth example aspect of the present invention, the fuel injection control device further has a range determining section for determining whether durations of ranges on an advance side and a delay side of the fuel inflow period in a combustion stabilization range are equal to or longer than a duration of the fuel injection period set by the injection period setting section. The combustion stabilization range is a range where a fuel injection period, in which combustion of the internal combustion engine stabilizes, can be set. When the range determining section determines that at least one of the durations of the advance side range and the delay side range is equal to or longer than the duration of the set fuel injection period, the injection period changing section shifts the fuel injection period set by the injection period setting section into the range determined to have the duration equal to or longer than the duration of the fuel injection period. Thus, the overlap between the fuel injection period and the fuel inflow period can be eliminated.

According to a fifth example aspect of the present invention, the fuel injection control device further has a range determining section for determining whether the sum of durations of ranges on an advance side and a delay side of the fuel inflow period in a combustion stabilization range is "equal to or longer than" a duration of the fuel injection period set by the injection period setting section. The combustion stabilization range is a range where a fuel injection period, in which combustion of the internal combustion engine stabilizes, can be set. The injection period changing section divides the fuel injection period set by the injection period setting section into both of the advance side range and the delay side range when a result of the determination by the range determining section is affirmative. Thus, the overlap between the fuel injection period and the fuel inflow period can be eliminated. Specifically, according to the above fifth example aspect of the present invention, even when both of the durations of the ranges on the advance side and the delay side of the fuel inflow period in the combustion stabilization range are shorter than the duration of the already-set fuel injection period, the overlap between the fuel injection period and the fuel inflow period can be eliminated by dividing the already-set fuel injection period.

If the fuel injection period is changed as mentioned above, there arises a concern about deterioration of the combustion of the internal combustion engine.

Therefore, according to a sixth example aspect of the present invention, the fuel injection control device further has a fuel pressure determining section for determining whether a pressure increase width of the fuel in the accumulator accompanying the fuel pumping by the pump section at each time is smaller than a predetermined value. The injection period changing section does not change the fuel injection period when a result of the determination by the fuel pressure determining section is affirmative. Thus, the fuel injection period is changed only in the case where the error in the fuel injection quantity becomes relatively large when the fuel injection period overlaps with the fuel inflow period.

According to a seventh example aspect of the present invention, the fuel injection control device further has an operation state determining section for determining whether the internal combustion engine is performing at least one of cold start and lean combustion. The injection period changing section does not change the fuel injection period when a result of the determination by the operation state determining section is affirmative. Thus, the fuel injection period is changed only when the combustion of the internal combustion engine is stable. Accordingly, the error of the fuel injection quantity can be inhibited while inhibiting the combustion deterioration of the internal combustion engine.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENT

Figure 1:
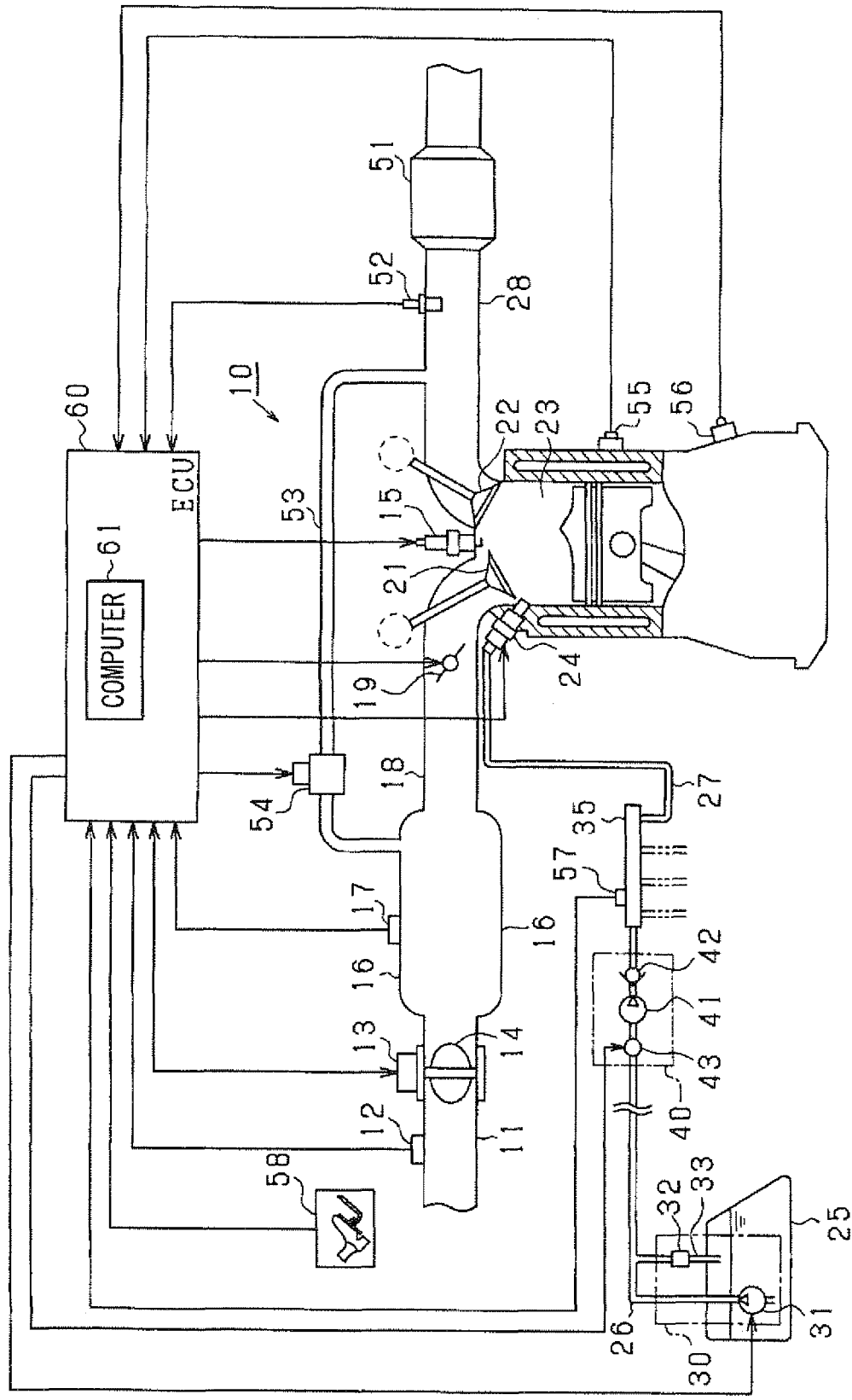
FIG. 1 is a diagram showing a schematic construction of an engine control system according to an embodiment of the present invention.

Hereafter, embodiments of the present invention will be described with reference to the drawings. The present embodiment is constructed as an engine control system for an in-vehicle multi-cylinder direct-injection gasoline engine as an internal combustion engine. The control system performs fuel injection control and the like using an electronic control unit (referred to as ECU, hereinafter) as a central device for control. FIG. 1 is a schematic construction diagram showing the entirety of the engine control system. It is assumed in the present embodiment that the engine is a four-cylinder engine.

In FIG. 1, an airflow meter 12 for sensing intake air quantity is provided in the most upstream portion of an intake pipe 11 of the engine 10. A throttle valve 14 is provided downstream of the airflow meter 12. An opening of the throttle valve 14 is regulated by a throttle actuator 13 such as a DC motor. The opening of the throttle valve 14 (throttle opening) is sensed with a throttle position sensor incorporated in the throttle actuator 13. A surge tank 16 is provided downstream of the throttle valve 14, and an intake pipe pressure sensor 17 for sensing intake pipe pressure is provided to the surge tank 16. An intake manifold 18 for introducing an air into each cylinder of the engine 10 is connected to the surge tank 16. An airflow control valve 19 that generates a swirl flow or a tumble flow is provided near an intake port of each cylinder in the intake manifold 18.

An intake valve 21 and an exhaust valve 22 are provided to the intake port and an exhaust port of the engine 10 respectively. The air in the surge tank 16 is introduced into a combustion chamber 23 by opening operation of the intake valve 21. Exhaust gas after the combustion is discharged to an exhaust pipe 28 by opening operation of the exhaust valve 22.

An injector 24 that supplies fuel directly into the combustion chamber 23 is fixed to a cylinder block of the engine 10. The injector 24 is connected with a fuel tank 25 through a high-pressure fuel pipe 27 and a low-pressure fuel pipe 26. The fuel in the fuel tank 25 is supplied to the injector 24 via the low-pressure fuel pipe 26 and the high-pressure fuel pipe 27.

A low-pressure pump section 30 is provided in the most upstream portion of a fuel supply route from the fuel tank 25 to the injector 24. A high-pressure pump section 40 is provided downstream of the low-pressure pump section 30. A delivery pipe 35 as a pressure accumulator is provided downstream of the high-pressure pump section 40. The low-pressure pump section 30 and the high-pressure pump section 40 are connected through the low-pressure fuel pipe 26. The injector 24 is connected to the delivery pipe 35 through the high-pressure fuel pipe 27. The low-pressure pump section 30 and the high-pressure pump section 40 correspond to a pump section.

The low-pressure pump section 30 has an electromagnetically-driven low-pressure pump 31 that is driven by power supply from a battery (not shown) and that is located in the fuel tank 25. The low-pressure pump 31 draws the fuel stored in the fuel tank 25 and pressurizes the fuel to feeding pressure (for example, 0.3 MPa). The low-pressure pump 31 pumps the fuel to the high-pressure pump section 40 through the fuel pipe 26. A regulator 32 (e.g., mechanical regulator) is connected between the low-pressure pump 31 and the high-pressure pump section 40. The regulator 32 regulates discharge pressure of the low-pressure pump 31 to constant pressure (feeding pressure) and returns excess fuel to the fuel tank 25 through a fuel return pipe 33.

An engine-driven high-pressure pump 41 is provided in the high-pressure pump section 40. The high-pressure pump 41 pressurizes the fuel, which is pumped from the low-pressure pump 31 at the predetermined pressure (feeding pressure), to higher pressure (e.g., 4 to 20 MPa) and discharges the fuel downstream. The fuel discharged from the high-pressure pump 41 is sent to the delivery pipe 35 through a check valve 42 and then distributed from the delivery pipe 35 to the injectors 24 of the respective cylinders.

Figure 2:
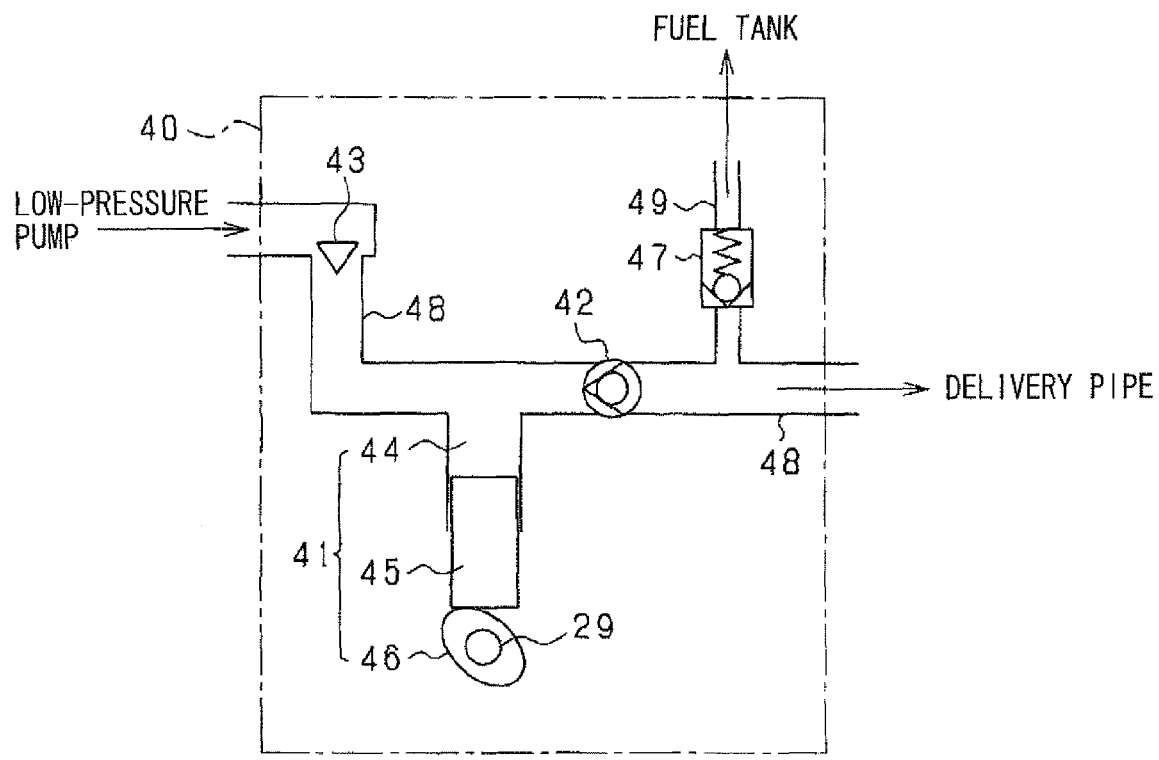
FIG. 2 is a diagram showing a construction of a high-pressure pump section according to the embodiment.

In the present embodiment, the high-pressure pump 41 is a piston pump that performs suction and discharge of the fuel by reciprocating motion of a plunger 45 as shown in FIG. 2. More specifically, in the high-pressure pump 41, a drive shaft 29 is driven and rotated by a crankshaft of the engine 10, and a cam mechanism 46 converts the rotational motion of the drive shaft 29 into the reciprocating motion of the plunger 45. When the plunger 45 performs the reciprocating motion inside a pump chamber 44 located in a fuel passage 48, the fuel is suctioned into or discharged from the pump chamber 44. In the present embodiment, the drive shaft 29 rotates once while the crankshaft rotates twice. A cam of the cam mechanism 46 has two cam protrusions. Thus, the plunger 45 performs the reciprocating motion twice while the drive shaft 29 rotates once. In this case, the high-pressure pump 41 performs the fuel discharge twice while the crankshaft of the engine 10 rotates once.

Figure 3:
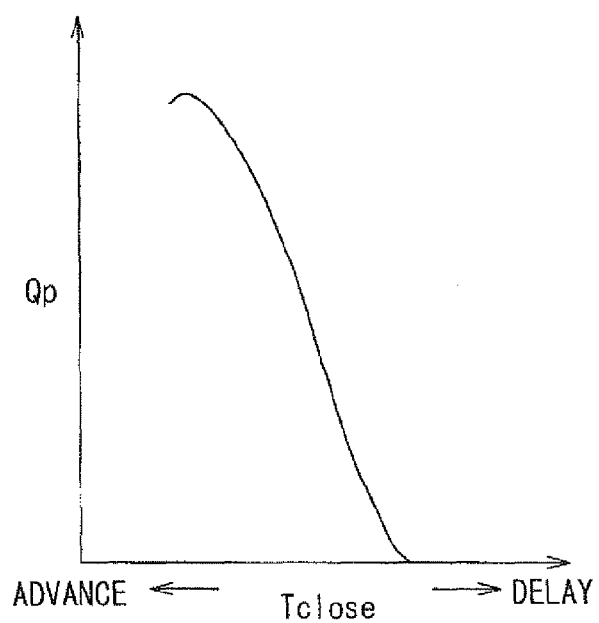
FIG. 3 is an illustrating diagram for illustrating an operation of the high-pressure pump section according to the embodiment.

A normally-opened fuel metering valve 43, which closes when energized, is provided on a fuel suction side of the high-pressure pump 41. Fuel discharge quantity of the high-pressure pump section 40 is adjusted by controlling valve closing time of the fuel metering valve 43. The fuel is suctioned into the pump chamber 44 when the plunger 45 descends. Thereafter, if the fuel metering valve 43 is de-energized when the plunger 45 starts to ascend, the fuel metering valve 43 maintains the opened state, whereby the fuel in the pump chamber 44 is returned upstream. If the fuel metering valve 43 is energized and closed, the pressure of the fuel in the pump chamber 44 rises, and the high-pressure fuel is pumped to the delivery pipe 35. In such the case, as valve closing timing (energization timing) of the fuel metering valve 43 is delayed more, a fuel pumping period shortens and eventually fuel pumping quantity decreases (refer to FIG. 3). In FIG. 3, Qp represents the fuel pumping quantity of the high-pressure pump section 40 and Tclose is the valve closing timing of the fuel metering valve 43. A normally-closed valve may be used as the fuel metering valve 43 instead of using the normally-opened valve.

In the high-pressure pump section 40, a relief valve 47 as a pressure release valve that restricts the fuel discharge pressure is provided downstream of the check valve 42. The relief valve 47 opens when the fuel discharge pressure of the high-pressure pump section 40 is equal to or higher than predetermined relief pressure (for example, 25 MPa). When the relief valve 47 is open, the relief valve 47 returns the discharge fuel of the high-pressure pump 41 to the fuel tank 25 through a fuel return pipe 49. Thus, the fuel pressure in the delivery pipe 35 is prevented from exceeding the relief pressure. Instead of arranging the relief valve 47 to the high-pressure pump section 40, the relief valve 47 may be arranged to the delivery pipe 35.

As shown in FIG. 1, a spark plug 15 is fixed to a cylinder head of the engine 10 for each cylinder. High voltage is applied to the spark plug 15 at desired ignition timing through an ignition device (not shown) constituted by an ignition coil and the like. Due to the applied high voltage, a spark discharge occurs between opposed electrodes of the spark plug 15. Thus, a mixture gas in the combustion chamber 23 is ignited and used for the combustion.

A catalysts 51 such as a three-way catalyst for purifying CO, HC, NOx and the like in the exhaust gas is provided in the exhaust pipe 28. An A/F sensor 52 (air-fuel ratio sensor) is provided upstream of the catalyst 51 in the exhaust pipe 28 for sensing an air-fuel ratio (or oxygen concentration) of the mixture gas (i.e., exhaust gas). The exhaust pipe 28 is connected to the surge tank 16 through an EGR pipe 53. An electromagnetically-driven EGR valve 54 is provided in the EGR pipe 53. A connection between the EGR pipe 53 and the exhaust pipe 28 may be arranged downstream of the catalyst 51. An opening of the EGR valve 54 (EGR opening) is adjusted so as to control quantity of the exhaust gas (EGR gas quantity) recirculated from the exhaust pipe 28 to an intake passage side.

A coolant temperature sensor 55 and a crank angle sensor 56 are fixed to the cylinder block of the engine 10. The coolant temperature sensor 55 senses coolant temperature. The crank angle sensor 56 outputs a rectangular crank angle signal at every predetermined crank angle (e.g., in the cycle of 30 degrees CA (crank angle)) of the engine 10. The system further has a fuel pressure sensor 57 for sensing fuel pressure in the delivery pipe 35, an accelerator sensor 58 for sensing accelerator operation amount by a driver, and the like.

An ECU 60 is constituted mainly by a microcomputer 61, which consists of CPU, ROM, RAM and the like. The ECU 60 executes various kinds of control programs stored in the ROM to perform various kinds of control of the engine 10 in accordance with an engine operation state of each time. For example, the ECU 60 calculates fuel injection quantity based on the operation state of the engine 10 (for example, intake air quantity and engine rotation speed). Then, the ECU 60 calculates fuel injection time based on the fuel injection quantity and the pressure of the fuel in the delivery pipe 35 preceding the fuel injection. The ECU 60 calculates fuel injection start timing based on the operation state of the engine 10. The ECU 60 sets the fuel injection time and the fuel injection start timing as a base injection period.

The ECU 60 performs feedback control of the pressure of the fuel in the delivery pipe 35. More specifically, the ECU 60 sets target pressure based on the operation state of the engine 10. The ECU 60 sets the valve closing timing of the fuel metering valve 43 based on difference between the pressure of the fuel in the delivery pipe 35 and the target pressure. The ECU 60 controls the fuel metering valve 43 in accordance with the valve closing timing of the fuel metering valve 43. Thus, a fuel pumping period (pumping quantity) of the high-pressure pump section 40 is controlled, and eventually the pressure of the fuel in the delivery pipe 35 is controlled to the target pressure.

Depending on the operation state of the engine 10, there is a possibility that a fuel inflow period, in which the high-pressure fuel flows into the delivery pipe 35 with the fuel pumping by the high-pressure pump section 40, overlaps with the base injection period. In this case, if the fuel injection by the injector 24 is performed during the base injection period, fuel injection pressure during the fuel injection changes with the inflow of the high-pressure fuel into the delivery pipe 35. Therefore, there is a possibility that an error arises between the fuel injection quantity actually injected during the base injection period, which is set based on the pressure of the fuel in the delivery pipe 35 preceding the fuel injection start, and the fuel injection quantity calculated based on the operation state of the engine 10. Therefore, in the present embodiment, when the base injection period overlaps with the fuel inflow period, the base injection period is changed to eliminate the overlap between the two periods, and the changed fuel injection period is set as the final injection period. Thus, the error of the fuel injection quantity can be inhibited.

If the base injection period is changed, there arises a concern about deterioration of the combustion of the engine 10. Therefore, in the present embodiment, the base injection period is changed into a crank angle range (combustion stabilization angle range) where the fuel injection period, in which the combustion of the engine 10 stabilizes, can be set. For example, the combustion stabilization angle range is a crank angle range of an intake stroke and a compression stroke of the engine 10 excluding following periods I and II. BTDC (Before Top Dead Center) is a crank angle position based on a compression top dead center (TDC).

Period I: A period that is immediately posterior to a start crank angle of the intake stroke and that has a predetermined crank angle width. The period I is a period, in which there is a concern about generation of soot due to wetness in the cylinder (for example, period from BTDC 360 degrees CA to BTDC 300 degrees CA).

Period II: A period that is immediately prior to an end crank angle of the compression stroke and that has a predetermined crank angle width. The period II is a period, in which there is a concern about deterioration of stratified charge combustion (for example, period from BTDC 30 degrees CA to TDC).

In the present embodiment, the base injection period is set immediately before or after the fuel inflow period to reduce the change of the base injection period. The base injection period is changed only when following conditions I and II are established.

Condition I: The change in the base injection period exerts a large effect to inhibit the error in the fuel injection quantity.

Condition II: The combustion deterioration of the engine 10 due to the change in the base injection period is small.

Figure 6:
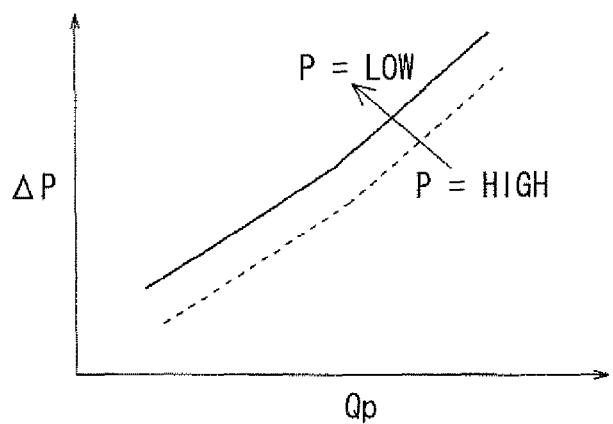
FIG. 6 is a diagram showing a relationship between fuel pumping quantity of the high-pressure pump section and accompanying increase of fuel pressure according to the embodiment.

In the present embodiment, the condition I is a condition that a pressure increase width ΔP of the fuel in the delivery pipe 35 accompanying the fuel pumping by the high-pressure pump section 40 is equal to or larger than a predetermined value. The fuel pressure increase width ΔP increases as the fuel pumping quantity Qp of the high-pressure pump section 40 increases as shown in FIG. 6. When the fuel pumping quantity Qp is the same, the fuel pressure increase width ΔP increases as the pressure P of the fuel in the delivery pipe 35 decreases as shown in FIG. 6. Therefore, the above determination about the pressure increase width ΔP of the fuel can be performed based on the fuel pumping quantity Qp and the fuel pressure P in the delivery pipe 35. In the present embodiment, the condition II is a condition that the engines 10 is performing neither cold start (i.e., start at low temperature) nor lean combustion.

As described above, the base injection period is changed into the combustion stabilization angle range, the base injection period is changed to the period immediately before or after the fuel inflow period, and the base injection period is changed only when the above conditions I and II are established. Thus, the error in the fuel injection quantity can be inhibited while inhibiting the combustion deterioration of the engine 10.

The pressure of the fuel in the delivery pipe 35 differs before and after the fuel inflow period as the result of the fuel inflow into the delivery pipe 35 during the fuel inflow period. Accordingly, if the base injection period is changed to a more delayed side than the fuel inflow period, there is a possibility that an error arises between the fuel injection quantity actually injected in the base injection period, which is set based on the pressure of the fuel in the delivery pipe 35 preceding the fuel inflow period, and the fuel injection quantity calculated based on the operation state of the engine 10. Therefore, when the base injection period is changed, the change of the base injection period to a crank angle range on a more advanced side than the fuel inflow period is prioritized over the change of the base injection period to a crank angle range on a more delayed side than the fuel inflow period. Thus, the error of the fuel injection quantity accompanying the change of the base injection period to the more delayed side than the fuel inflow period can be inhibited.

Figure 4:
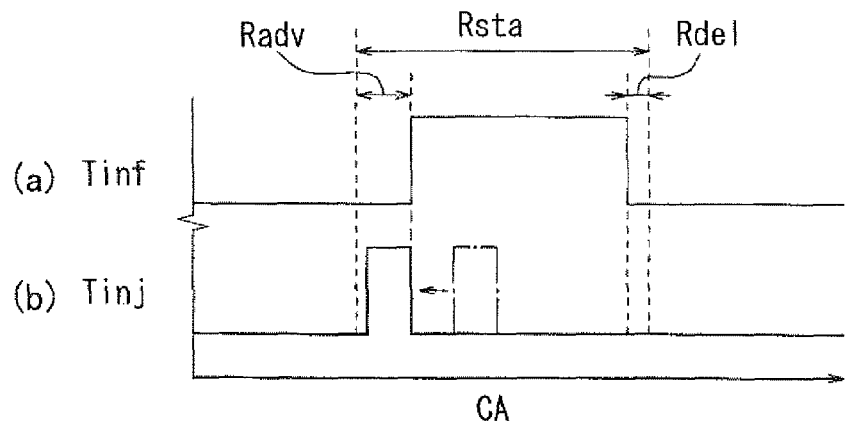
FIG. 4 is a timing chart showing an example of changing processing of a base injection period according to the embodiment.
Figure 5:
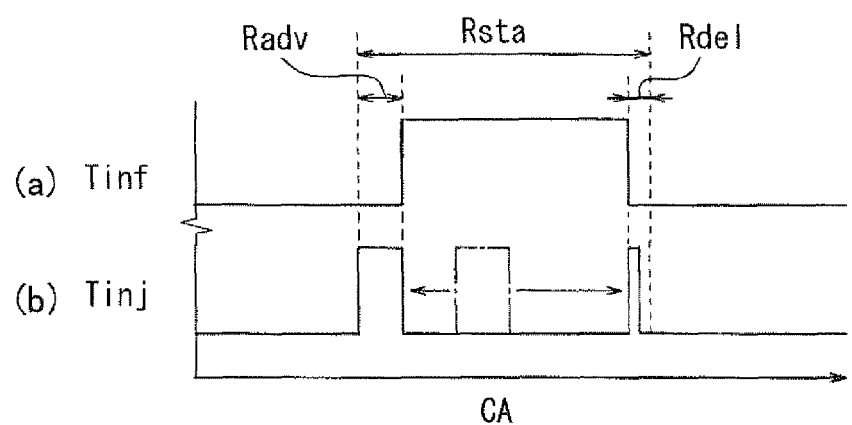
FIG. 5 is a timing chart showing another example of the changing processing of the base injection period according to the embodiment.

FIGS. 4 and 5 are timing charts showing examples of changing processing of the above-described base injection period. In each of FIGS. 4 and 5, part (a) shows the fuel inflow period Tinf, and part (b) shows the fuel injection period Tinj. A chained line in part (b) shows the base injection period. In following explanation, in the combustion stabilization angle range Rsta, a range on the more advanced side than the fuel inflow period Tinf will be referred to as an advance side range Radv, and a range on the more delayed side than the fuel inflow period Tinf will be referred to as a delay side range Rdel.

When either one of crank angle widths of the advance side range Radv and the delay side range Rdel of the combustion stabilization angle range Rsta is equal to or larger than the crank angle width of the base injection period as shown in FIG. 4, the overlap between the fuel injection period Tinj of the injector 24 and the fuel inflow period Tinf can be eliminated by shifting the base injection period to the range (Radv or Rdel) having the crank angle width equal to or larger than that of the base injection period. In the present embodiment, specifically, shifting the base injection period means changing the start crank angle of the base injection period (i.e., fuel injection start timing) to the advance side or the delay side. When the base injection period is defined by the start crank angle and the end crank angle, the base injection period can be shifted by changing the start crank angle and the end crank angle to the advance side or the delay side.

As contrasted thereto, in the example of FIG. 5, both of the crank angle widths of the advance side range Radv and the delay side range Rdel of the combustion stabilization angle range Rsta are smaller than the crank angle width of the base injection period. Such the situation can occur when the combustion stabilization angle range Rsta shortens, when the fuel injection period Tinj lengthens or when the fuel inflow period Tinf lengthens in accordance with the operation state of the engine 10. In such the case, the overlap between the fuel injection period Tinj of the injector 24 and the fuel inflow period Tinf cannot be eliminated even if the base injection period is shifted into the advance side range Radv or the delay side range Rdel of the combustion stabilization angle range Rsta. Therefore, in the present embodiment, in such the case as shown in FIG. 5, the base injection period is divided into both of the advance side range Radv and the delay side range Rdel of the combustion stabilization angle range Rsta and the fuel injection period Tinj after the division is set as the final injection period. Thus, even when both of the crank angle widths of the advance side range Radv and the delay side range Rdel of the combustion stabilization angle range Rsta are smaller than the crank angle width of the base injection period, the overlap between the fuel injection period Tinj of the injector 24 and the fuel inflow period Tinf can be removed if the sum of the crank angle widths of the advance side range Radv and the delay side range Rdel is equal to or larger than the crank angle width of the base injection period.

Figure 7:
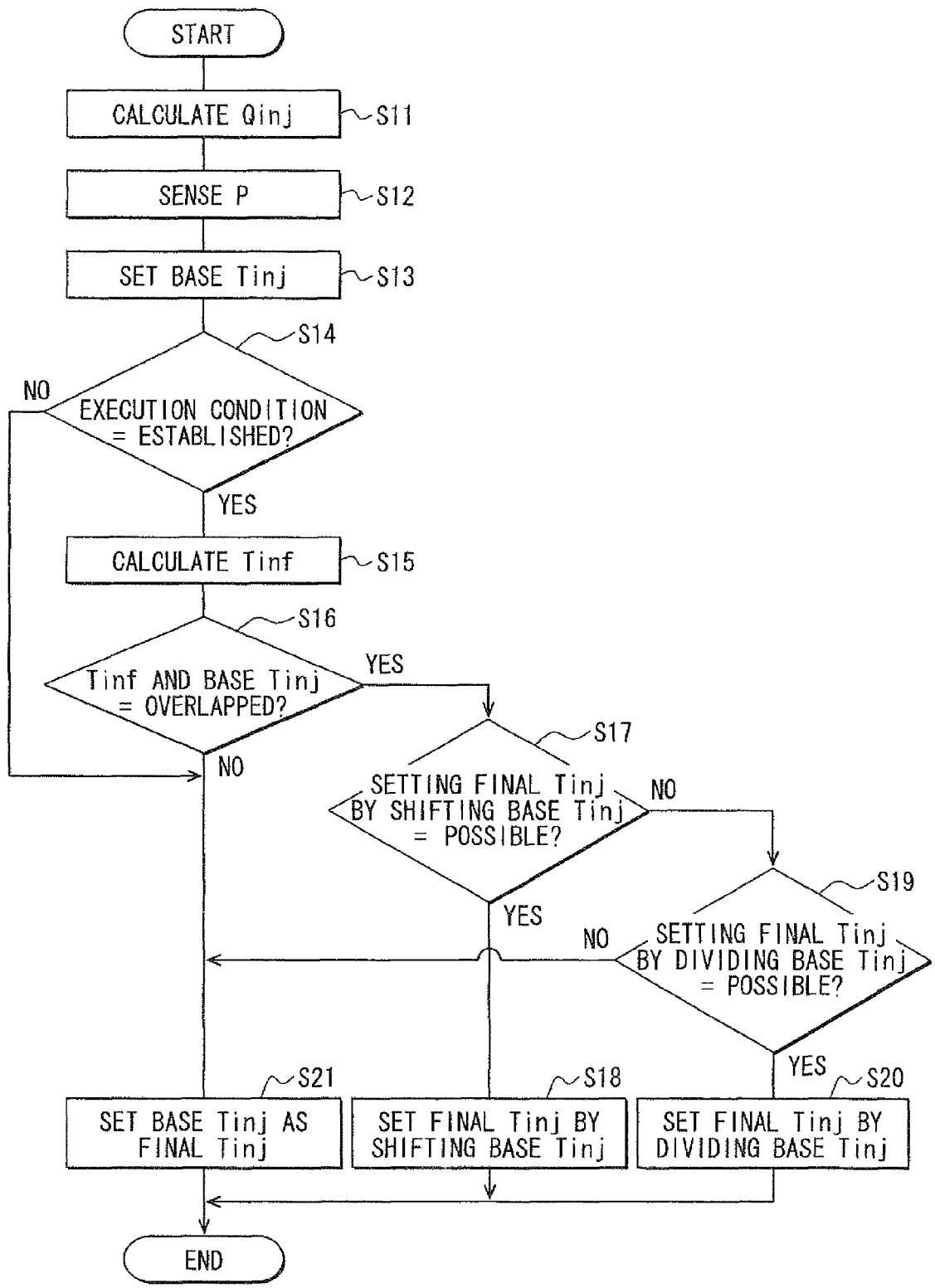
FIG. 7 is a flowchart showing a flow of a fuel injection period setting program according to the embodiment.

Next, fuel injection period setting processing according to the present embodiment will be explained in detail with reference to FIG. 7. FIG. 7 is a flowchart showing a flow of a fuel injection period setting program according to the present embodiment. In the present embodiment, it is assumed that the microcomputer 61 of the ECU 60 executes the program at a predetermined crank angle (for example, at BTDC 450 degrees CA) to realize the fuel injection period setting processing.

In S11 (S means "Step") shown in FIG. 7, the microcomputer 61 calculates the intake air quantity and the engine rotation speed of the engine 10 based on the sensing signal of the airflow meter 12 and the crank angle signal of the crank angle sensor 56 respectively. Also in S11, the microcomputer 61 calculates the fuel injection quantity Qinj based on the intake air quantity and the engine rotation speed. In following S12, the microcomputer 61 calculates the pressure P of the fuel in the delivery pipe 35 based on the sensing signal of the fuel pressure sensor 57. In following S13, the microcomputer 61 calculates the crank angle width (i.e., fuel injection time) of the base injection period (BASE Tinj, in FIG. 7) based on the fuel injection quantity Qinj and the pressure P of the fuel in the delivery pipe 35. In addition, the microcomputer 61 calculates the start crank angle of the base injection period (i.e., fuel injection start timing) based on the intake air quantity and the engine rotation speed.

In following S14, the microcomputer 61 determines whether an execution condition of the changing processing of the base injection period is established. More specifically, the microcomputer 61 determines whether the above-mentioned condition I is established, i.e., whether the pressure increase width ΔP of the fuel in the delivery pipe 35 accompanying the fuel pumping by the high-pressure pump section 40 is "equal to or larger than" the predetermined value, based on the fuel pumping quantity Qp calculated in the above-mentioned feedback processing of the fuel pressure P and the fuel pressure P in the delivery pipe 35. Further, the microcomputer 61 determines whether the above-mentioned condition II is established, i.e., whether the engine 10 is performing neither the cold start nor the lean combustion, based on the sensing signals of the coolant temperature sensor 55 and the A/F sensor 52. When both of the conditions I and II are established, the microcomputer 61 proceeds to the changing processing of the base injection period of S15 to S20. If either of the conditions I and II is not established, the microcomputer 61 sets the base injection period as the final injection period (FINAL Tinj in FIG. 7) in S21 and ends the current execution of the program. The determination of whether the engine 10 is performing the lean combustion may be performed based on a target value of the air-fuel ratio of the engine 10.

In S15, the microcomputer 61 calculates the fuel inflow period Tinf to the delivery pipe 35 based on the fuel pumping period calculated by the above-mentioned fuel pressure feedback processing. In following S16, the microcomputer 61 determines whether the base injection period and the fuel inflow period Tinf overlap with each other. If the microcomputer 61 determines that the base injection period and the fuel inflow period Tinf overlap with each other, the microcomputer 61 proceeds to processing of S17. If the microcomputer 61 determines that the base injection period and the fuel inflow period Tinf do not overlap with each other, the microcomputer 61 sets the base injection period as the final injection period in S21 and ends the current execution of the program.

In S17, the microcomputer 61 determines whether the final injection period can be set by shifting the base injection period. More specifically, the microcomputer 61 determines whether the crank angle widths of the advance side range Radv and the delay side range Rdel of the combustion stabilization angle range Rsta (refer to FIG. 4) are "equal to or larger than" the crank angle width of the base injection period. When it is determined that either one of the crank angle widths of the advance side range Radv and the delay side range Rdel of the combustion stabilization angle range Rsta is equal to or larger than the crank angle width of the base injection period, the microcomputer 61 determines that the final injection period can be set by shifting the base injection period and proceeds to processing of S18. If it is determined that both of the crank angle widths of the advance side range Radv and the delay side range Rdel are smaller than the crank angle width of the base injection period, the microcomputer 61 determines that the final injection period cannot be set by shifting the base injection period and proceeds to processing of S19.

In S18, the microcomputer 61 shifts the base injection period to a period immediately before or after the fuel inflow period Tinf in the range (Radv or Rdel) that is determined in S17 to have the crank angle width equal to or larger than the crank angle width of the base injection period. Specifically, when both of the crank angle widths of the advance side range Radv and the delay side range Rdel of the combustion stabi- lization angle range Rsta are equal to or larger than the crank angle width of the base injection period, the microcomputer 61 shifts the base injection period into the advance side range Radv.

More specifically, when the crank angle width of the advance side range Radv of the combustion stabilization angle range Rsta is equal to or larger than the crank angle width of the base injection period or when both of the crank angle widths of the advance side range Radv and the delay side range Rdel of the combustion stabilization angle range Rsta are equal to or larger than the crank angle width of the base injection period, the microcomputer 61 changes the base injection period into a fuel injection period extending from "end crank angle of advance side range Radv−crank angle width of base injection period" to "end crank angle of advance side range Radv." When the crank angle width of the delay side range Rdel of the combustion stabilization angle range Rsta is equal to or larger than the crank angle width of the base injection period, the microcomputer 61 changes the base injection period into a fuel injection period extending from "start crank angle of delay side range Rdel" to "start crank angle of delay side range Rdel+crank angle width of base injection period." Thus, the final injection period can be set immediately before or after the fuel inflow period Tinf within the combustion stabilization angle range Rsta such that the final injection period does not overlap with the fuel inflow period Tinf.

In S19, the microcomputer 61 determines whether the final injection period can be set by dividing the base injection period. More specifically, the microcomputer 61 determines whether the sum of the crank angle widths of the advance side range Radv and the delay side range Rdel of the combustion stabilization angle range Rsta is "equal to or larger than" the crank angle width of the base injection period. If the result of the determination is affirmative, the microcomputer 61 determines that the final injection period can be set by dividing the base injection period and proceeds to processing of S20. If the result of the determination is negative, the microcomputer 61 determines that the final injection period cannot be set by dividing the base injection period and progresses to S21. In S21, the microcomputer 61 sets the base injection period as the final injection period and ends the current execution of the program.

In S20, the microcomputer 61 divides the base injection period into both of the advance side range Radv and the delay side range Rdel of the combustion stabilization angle range Rsta. Thus, the microcomputer 61 sets the final injection period immediately before and after the fuel inflow period Tinf in the combustion stabilization angle range Rsta such that the final injection period does not overlap with the fuel inflow period Tinf. More specifically, the microcomputer 61 divides the base injection period into a fuel injection period extending over the entirety of the advance side range Radv and a fuel injection period extending during a part of the delay side range Rdel and sets the fuel injection periods as the final injection period. More specifically, the microcomputer 61 divides the base injection period into a fuel injection period extending from "start crank angle of advance side range" to "end crank angle of advance side range" and a fuel injection period extending from "start crank angle of delay side range" to "start crank angle of delay side range+(injection time of base injection period−crank angle width of advance side range)" and sets the fuel injection periods as the final injection period.

Figure 8:
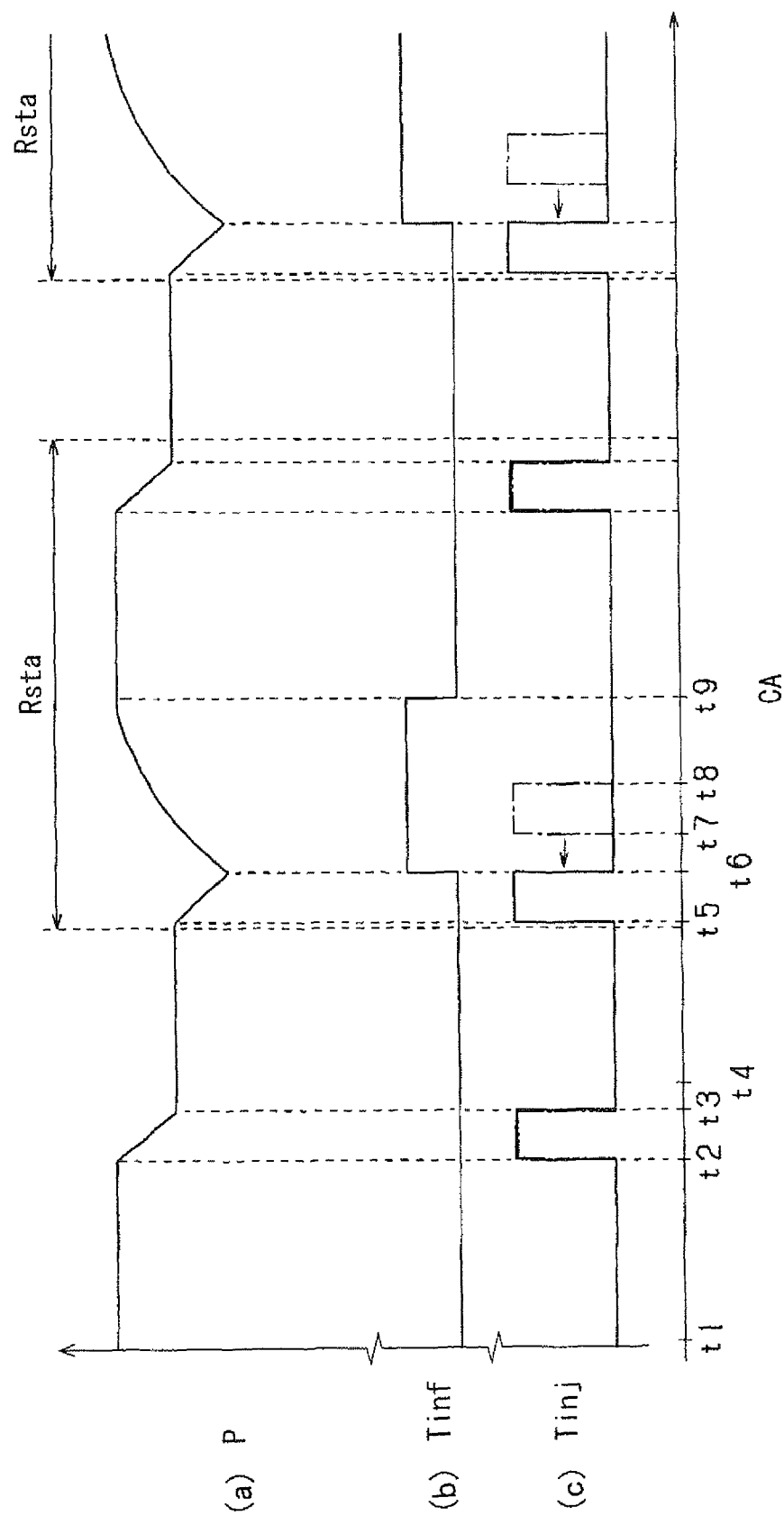
FIG. 8 is a timing chart showing a mode of fuel injection period setting processing according to the embodiment.

Next, an example mode of the fuel injection control according to the present embodiment will be explained with reference to FIG. 8. In FIG. 8, part (a) shows a transition of the pressure P of the fuel in the delivery pipe 35, part (b) shows the fuel inflow period Tint and part (c) shows the fuel injection period Tinj. A chained line in part (c) shows the base injection period. In FIG. 8, it is assumed that the fuel pumping by the high-pressure pump section 40 is performed twice in 720 degrees CA, and the fuel injection by the injector 24 is performed four times (per four cylinders) in 720 degrees CA.

The above-mentioned setting processing of the fuel injection period Tinj is performed at timing t1 of FIG. 8 and the base injection period is set as a period from timing t2 to timing t3. Since the period from the timing t2 to the timing t3 is outside the fuel inflow period Tinf, the period from the timing t2 to the timing t3 is set as the final injection period. As a result, the fuel injection by the injector 24 is performed and the fuel flows out of the delivery pipe 35 from the timing t2 to the timing t3. Accordingly, the pressure P of the fuel in the delivery pipe 35 decreases in that period.

The above-mentioned fuel injection period setting processing is performed at timing t4 and the base injection period is set as a period from timing t7 to timing t8. Since the period from the timing t7 to the timing t8 resides within the fuel inflow period Tinf (from timing t6 to timing t9 in part (b) of FIG. 8), the base injection period is shifted to a period from timing t5 to the timing t6 immediately before the fuel inflow period Tinf within the combustion stabilization angle range Rsta. The shifted fuel injection period Tinj is set as the final injection period. As a result, the fuel injection by the injector 24 is performed and the fuel flows out of the delivery pipe 35 from the timing t5 to the timing t6. Accordingly, the pressure P of the fuel in the delivery pipe 35 decreases in that period. The high-pressure pump section 40 pumps the fuel and the fuel flows into the delivery pipe 35 from the timing t6 to the timing t9. Accordingly, the pressure P of the fuel in the delivery pipe 35 increases in that period. In this case, the pressure P of the fuel in the delivery pipe 35 does not change with the fuel pumping by the high-pressure pump section 40 during the fuel injection.

The above-described present embodiment exerts following effects.

The overlap between the fuel injection period of the injector 24 and the fuel inflow period is eliminated. Thus, the change of the fuel injection pressure accompanying the fuel inflow into the delivery pipe 35 during the fuel injection is inhibited. Accordingly, the error in the fuel injection quantity can be inhibited.

The base injection period is changed into the combustion stabilization angle range. The base injection period is changed to the period immediately before or after the fuel inflow period. The base injection period is unchanged when the change in the base injection period exerts only a small effect to inhibit the error in the fuel injection quantity or when the change of the base injection period causes significant combustion deterioration of the engine 10. Thus, the error of the fuel injection quantity can be inhibited while inhibiting the combustion deterioration of the engine 10 accompanying the change of the base injection period.

It is determined whether the crank angle widths of the advance side range and the delay side range are "equal to or larger than" the crank angle width of the base injection period. The base injection period is changed in accordance with the result of the determination. More specifically, when either one of the crank angle widths of the advance side range and the delay side range is equal to or larger than the crank angle width of the base injection period, the base injection period is shifted into the range having the crank angle width equal to or larger than that of the base injection period. When the sum of the crank angle widths of the advance side range and the delay side range of the combustion stabilization angle range is larger than the crank angle width of the base injection period, the base injection period is divided into the advance side range and the delay side range. Thus, the overlap between the fuel injection period of the injector 24 and the fuel inflow period can be eliminated effectively. Specifically, even when both of the crank angle widths of the advance side range and the delay side range of the combustion stabilization angle range are smaller than the crank angle width of the base injection period, the overlap between the fuel injection period of the injector 24 and the fuel inflow period can be eliminated by dividing the base injection period.

When the base injection period is changed, the change of the base injection period to the more advanced side than the fuel inflow period is prioritized over the change of the base injection period to the more delayed side than the fuel inflow period. More specifically, when both of the crank angle widths of the advance side range and the delay side range of the combustion stabilization angle range are equal to or larger than the crank angle width of the base injection period, the base injection period is shifted into the advance side range. When the sum of the crank angle widths of the advance side range and the delay side range of the combustion stabilization angle range is equal to or larger than the crank angle width of the base injection period, the base injection period is divided into the fuel injection period extending over the entirety of the advance side range and into the fuel injection period extending during a part of the delay side range. Thus, the change of the base injection period to the delay side range is inhibited. Accordingly, the error of the fuel injection quantity accompanying the change of the base injection period to the delay side can be inhibited. Since time from the fuel injection to the ignition can be secured by changing the base injection period to the advance side range, homogeneous combustion can be performed suitably in the engine 10.

The present invention is not limited to the above-described embodiment but may be implemented as follows, for example.

The base injection period may be divided into three or more fuel injection periods. By increasing the fuel injection time number per combustion cycle in this way, the fuel and the air are mixed suitably and the combustion of the engine 10 can be stabilized.

The combustion stabilization angle range changes with the operation state of the engine 10. Therefore, it is desirable to calculate the combustion stabilization angle range of each time based on the operation state of the engine 10 and to change the base injection period into the combustion stabilization angle range. Thus, the control of the engine 10 can be stabilized further.

When the base injection period is changed into the delay side range of the combustion stabilization angle range, decrease correction of the crank angle width of the base injection period may be performed. That is, the crank angle width (fuel injection time) in the case where the base injection period is changed into the delay side range may be reduced in consideration of the pressure increase of the fuel in the delivery pipe 35 (i.e., rise in fuel injection pressure) during the fuel inflow period. Thus, when the base injection period is changed into the delay side range, the error of the fuel injection quantity accompanying the change can be inhibited. When the above decrease correction is performed, it is desirable to set correction quantity corresponding to the pressure increase width of the fuel in the delivery pipe 35 during the fuel inflow period.

Figure 9:
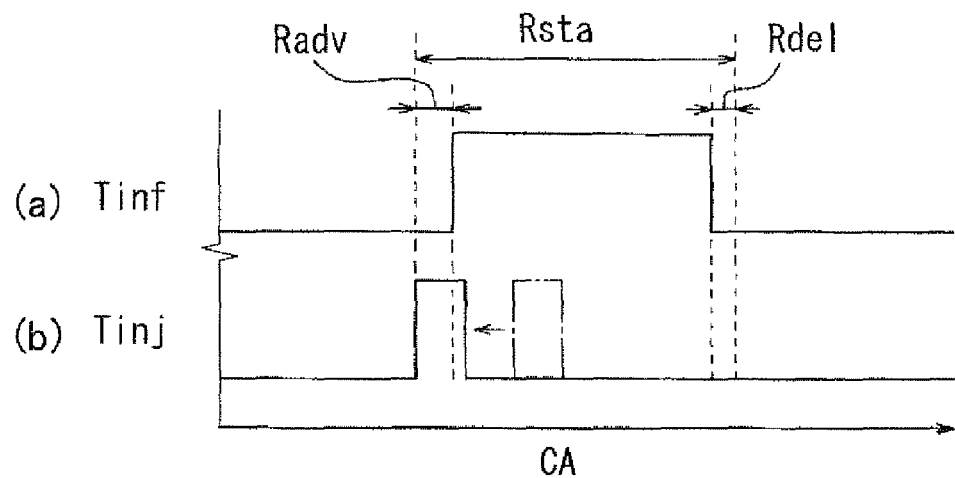
FIG. 9 is a timing chart showing changing processing of a base injection period according to a modified embodiment of the present invention.
Figure 10:
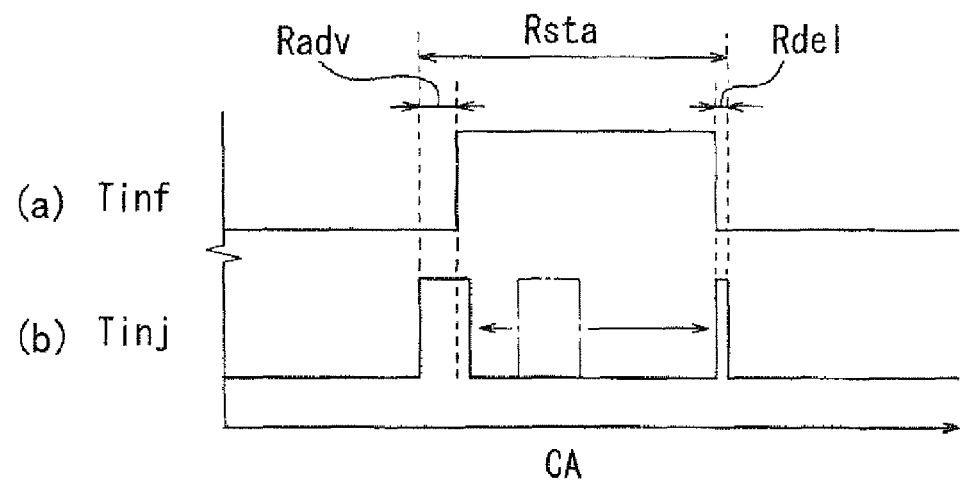
FIG. 10 is a timing chart showing changing processing of a base injection period according to another modified embodiment of the present invention.

The base injection period may be changed to reduce the overlap between the fuel injection period of the injector 24 and the fuel inflow period. For example, when the sum of the crank angle widths of the advance side range Radv and the delay side range Rdel of the combustion stabilization angle range Rsta is smaller than the crank angle width of the base injection period, the base injection period may be changed into the fuel injection period Tinj extending from "start crank angle of advance side range Radv" to "start crank angle of advance side range Radv+crank angle width of base injection period" as shown in FIG. 9. Alternatively, the base injection period may be divided into a fuel injection period extending from "start crank angle of delay side range Rdel" to "end crank angle of delay side range Rdel" and a fuel injection period extending from "start crank angle of advance side area Radv" to "end crank angle of advance side range Radv+ (crank angle width of base injection period−sum of crank angle widths of advance side range Radv and delay side range Rdel)" as shown in FIG. 10. The error in the fuel injection quantity can be inhibited also in these cases.

The application of the present invention is not limited to the direct-injection gasoline engine. The present invention can be applied also to a diesel engine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel injection control device that is applied to a fuel supply system having a pump section driven by an internal combustion engine for pumping fuel in a fuel tank, an accumulator for storing the fuel pumped by the pump section and an injector for performing injection supply of the fuel in the accumulator directly into a cylinder of the internal combustion engine and that controls fuel injection quantity of the injector, the fuel injection control device comprising:
    an injection period setting means for setting an injection period of the fuel of the injector based on the fuel injection quantity of each time and pressure of the fuel in the accumulator;
    an overlap determining means for determining whether the fuel injection period set by the injection period setting means overlaps with a fuel inflow period, in which the high-pressure fuel flows into the accumulator with the fuel pumping by the pump section; and
    an injection period changing means for changing the fuel injection period set by the injection period setting means to an advance side or a delay side to eliminate or reduce the overlap when the overlap determination means determines that the fuel injection period overlaps with the fuel inflow period.

2. The fuel injection control device as in claim 1, wherein the injection period changing means performs decrease correction of a duration of the fuel injection period when the injection period changing means changes the fuel injection period to the delay side.

3. The fuel injection control device as in claim 1, wherein the injection period changing means prioritizes change of the fuel injection period to the advance side over change of the fuel injection period to the delay side when the injection period changing means changes the fuel injection period.

4. The fuel injection control device as in claim 1, further comprising:
    a range determining means for determining whether durations of ranges on an advance side and a delay side of the fuel inflow period in a combustion stabilization range are equal to or longer than a duration of the fuel injection period set by the injection period setting means, the combustion stabilization range being a range where a fuel injection period, in which combustion of the internal combustion engine stabilizes, can be set, wherein when the range determining means determines that at least one of the durations of the advance side range and the delay side range is equal to or longer than the duration of the set fuel injection period, the injection period changing means shifts the fuel injection period set by the injection period setting means into the range determined to have the duration equal to or longer than the duration of the fuel injection period.

5. The fuel injection control device as in claim 1, further comprising:

a range determining means for determining whether the sum of durations of ranges on an advance side and a delay side of the fuel inflow period in a combustion stabilization range is "equal to or longer than" a duration of the fuel injection period set by the injection period setting means, the combustion stabilization range being a range where a fuel injection period, in which combustion of the internal combustion engine stabilizes, can be set, wherein the injection period changing means divides the fuel injection period set by the injection period setting means into both of the advance side range and the delay side range when a result of the determination by the range determining means is affirmative.

6. The fuel injection control device as in claim 1, further comprising:

a fuel pressure determining means for determining whether a pressure increase width of the fuel in the accumulator accompanying the fuel pumping by the pump section at each time is smaller than a predetermined value, wherein the injection period changing means does not change the fuel injection period when a result of the determination by the fuel pressure determining means is affirmative.

7. The fuel injection control device as in claim 1, further comprising:

an operation state determining means for determining whether the internal combustion engine is performing at least one of cold start and lean combustion, wherein the injection period changing means does not change the fuel injection period when a result of the determination by the operation state determining means is affirmative.

* * * * *